United States Patent [19]

Everett et al.

[11] Patent Number: 4,829,660
[45] Date of Patent: May 16, 1989

[54] SYSTEM FOR REMOVING A PLUG FROM A HEAT EXCHANGER TUBE

[75] Inventors: James W. Everett, Hempfield Township, Westmoreland County, Pa.; John B. Gunter, Catonsville, Md.; William Woolfolk, Export, Pa.; Frank Sadofsky, Pittsburgh, Pa.; Lawrence A. Nelson, Penn Township, Westmoreland County, Pa.; George D. Fulmer, Hempfield Township, Westmoreland County, Pa.; George G. Elder, Monroeville, Pa.; Robert F. Keating, Trafford, Pa.

[73] Assignee: Westinghouse Electric Corp., Pittsburgh, Pa.

[21] Appl. No.: 50,799

[22] Filed: May 18, 1987

[51] Int. Cl.[4] .............................. B23P 15/26
[52] U.S. Cl. ..................... 29/727; 29/157.3 C; 29/157.3 R; 29/402.03; 29/426.4; 29/426.6; 29/723
[58] Field of Search ............. 29/426.1, 426.4, 426.5, 29/426.6, 447, 723, 727, 234, 235, 237, 726, 157.3 R, 157.4, 402.03, 157.3 C; 228/119; 138/89, 97

[56] References Cited

U.S. PATENT DOCUMENTS

| 1,535,007 | 4/1925 | Wood . | |
|---|---|---|---|
| 3,120,700 | 2/1964 | Chuplis, Jr. | 29/726 |
| 3,367,011 | 2/1968 | Sipher . | |
| 3,507,028 | 4/1970 | Stellatelle | 29/726 |
| 3,791,011 | 2/1974 | Keys | 29/726 |
| 3,900,939 | 8/1975 | Creacen | 29/447 |
| 3,986,245 | 10/1976 | Savor et al. . | |
| 4,366,617 | 1/1983 | Nanstiel et al. . | |
| 4,390,042 | 1/1983 | Kucherer et al. . | |
| 4,400,122 | 8/1983 | Minnaar et al. . | |
| 4,555,833 | 12/1985 | Hawkins et al. | 29/726 |
| 4,670,975 | 6/1987 | Dettinger | 29/726 |
| 4,679,315 | 7/1987 | Overbay | 29/426.5 |
| 4,734,972 | 4/1988 | Hawkins | 29/426.4 |

FOREIGN PATENT DOCUMENTS

| 0035911 | 7/1973 | European Pat. Off. . |
| 0153563 | 4/1981 | European Pat. Off. . |
| 2439059 | 11/1983 | France . |

*Primary Examiner*—P. W. Echols
*Assistant Examiner*—Irene Cuda

[57] ABSTRACT

An improved system for removing a plug from the open end of a heat exchanger tube in a nuclear steam generator is disclosed herein. It is particularly adapted for removing a plug formed from an elongated, cylindrical shell of Inconel ® having a closed end, an open ends, and an expander element that radially expands the shell when axially drawn from the clossed to the open end of the shell. The system comprises an expander remover for axially pushing the expander element from the open end completely through the closed end of the plug shell, and a TIG torch for creating beads along the longitudinal axis of the plug shell which relax the engagement between the plug shell and the tube after the weld beams harden. Finally, the system includes a plug puller for pulling the loosened plug from the tube. The expander remover and plug puller maybe remotely operated by means of a robotic arm, and a compliance coupling is provided to facilitate alignment between these tools and the plugged end of a selected heat exchanger tube.

19 Claims, 7 Drawing Sheets

SYSTEM FOR REMOVING A PLUG FROM A HEAT EXCHANGER TUBE

BACKGROUND OF THE INVENTION

1. Field of the Invention

This invention generally relates to systems and methods for removing plugs from conduits, such as the heat exchanger tubes in nuclear steam generators.

2. Description of the Prior Art

Devices for the removing the plugs from the heat exchanger tubes in nuclear steam generators are known in the prior art. The use of such devices has become increasingly popular in recent years, as new repair techniques for putting such plugged tubes back into service have become available. However, in order to fully appreciate the operation and the utility of such prior art plug-pulling devices, a general understanding of the structure and operation of the plugs used in such tubes is necessary.

The plugs that are most frequently used to plug the heat exchanger tubes of nuclear steam generators are generally formed from a tubular shell of Inconel ® that is open on one end and closed at the other end. The interior of the shell contains a frustoconically shaped expander member. In one of the most commonly used types of plugs, the expander element is a round wedge shaped like a common cork used to seal a bottle, and is disposed completely within the interior of the shell with its larger circular end in abutment with the inner surface of the closed distal end of the plug shell. The shell walls are not truly cylindrical, but are slightly tapered from the distal closed end to the proximal open end of the shell When the cork-shaped expander is forcefully pulled from the closed end toward the open end of the shell by a hydraulic ram, it will radially expand the plug in sealing engagement with the interior wall of a tube by a wedging action. Such a plug design is described in U.S. Pat. No. 4,390,042 invented by Harvey D. Kucherer and assigned to the Westinghouse Electric Corporation. The forceful pulling of the cork-shaped expander element along the longitudinal axis of the shell not only radially expands the wall of the shell outwardly as the expander is wedgingly drawn towards the proximal end of the shell, but further applies an extruding force to the metallic walls of the shell along the longitudinal axis of the tube. The end result is that lands circumscribing the outer walls of the shell are securely engaged against the interior wall of the heat exchanger tube.

Generally, such plugs are used to seal off one or more of the U-shaped heat exchanger tubes contained within a nuclear steam generator when the walls of these tubes become corroded beyond repair. This is accomplished by inserting the unexpanded plug into the open end of the tube, and then expanding the plug. If such tubes are not plugged, they may crack and allow radioactive water from the primary side of the generator to leak into the non-radioactive water in the secondary side. This in turn, could result in the radioactive contamination of the non-radioactive steam that Westinghouse-type nuclear generators provide to turn the turbines of the electric generators of the plant. Hence the plugging of potentially defective heat exchanger tubes is an important maintenance operation.

Recently however, new maintenance procedures pioneered by the Westinghouse Electric Corporation have made it possible to repair heat exchanger tubes in nuclear steam generators that were heretofore considered beyond repair. Such techniques include tube expansions to eliminate the annular clearances between the heat exchanger tubes and the tube sheets and support plates in the generator, and new stress-relief techniques such as rotopeening and heat treatment processes. As the plugging of a heat exchanger tube diminishes the capacity of the nuclear steam generator to generate power, it has become increasingly popular to remove the plugs that were placed in the open ends of heat exchange tubes when the repair and maintenance of such tubes becomes possible due to the application of new techniques.

Prior art plug-removing devices are generally comprised of a push-rod for pushing the expander element back toward the enclosed end of the shell to relax the shell within the tube, and a pulling fitting concentrically disposed around the push-rod for threadedly engaging and pulling the plug shell from the open end of the tube after the push-rod has moved the expander element upwardly. Such devices are generally powered by a hydraulic ram having two, concentrically disposed hydraulic cylinders.

Unfortunately, the use of such prior art plug-pulling devices does not always produce perfect results. For example, because of the extruding force that the expander element applies between the lands on the outer shell wall and the interior wall of the tube, some degree of solid phase welding occurs between the plug shell and the tube. Hence the hydraulic cylinder connected to the fitting that pulls the plug from the tube may have to apply as much as fourteen thousand pounds of tensile force before the plug is successfully pulled out. The application of this tensile force in combination with the solid-phase welding that has occurred between the plug and the tube causes a substantial amount of galling and scratching to occur between the plug and the open end of the tube during the removal operation. Such scratching and galling not only mars the inner surface of the tube, but generates stresses in the mouth of the tube which may give rise to stress corrosion cracking. Other imperfections of such prior art devices include the difficulty of aligning the working ends of these tools with the part of the open end of the tube to be unplugged by means of a robotic device. Such tools can of course be manipulated manually. However, the manual operation of such tools can cause the maintenance personnel of the generator to become exposed to potentially harmful radiation.

Clearly, there is a need for a device for removing plugs from the heat exchanger tubes of nuclear steam generators which does not scratch or gall the open ends of the tubes. Ideally, such a device should be remotely operable by means of a robotic device so as to minimize the exposure of service personnel to potentially harmful radiation. To minimize the cost of constructing and using the tool, it would be desirable if the device were operable by means of a commercially available robotic device.

SUMMARY OF THE INVENTION

In its broadest sense, the invention is both an improved system and a method for removing a plug from a conduit, such as a heat exchanger tube of a steam generator. It is particularly applicable to removing plugs formed from an elongated, cylindrical shell having a closed end, an open end, and an interior that includes a tapered inner wall section, and an expander element that wedgingly engages the tapered wall section in order to radially expand the outer wall of the plug into sealing engagement with the inner wall of the tube.

The improved system generally comprises a fusing means, such as a torch, for creating at least one weld bead on the tapered inner wall section along the longitudinal axis of the shell in order to contract the outer shell wall, an expander remover for pushing the expander element from the open to the closed end of the shell to both loosen the shell within the tube and to provide access within the shell interior for the torch, and a plug puller for pulling the plug shell from the tube after the torch has a created a wall-contracting weld bead on the inner tapered wall of the plug shell.

The expander remover may include a pushing mechanism having a pushing tip for moving the expander out of wedging engagement with the inner tapered wall section of the plug shell. The pushing tip may be connected to the rest of the pushing mechanism by means of a floating coupling that allows some sideways play in the pushing tip. This sideways play greatly facilitates the proper alignment between the pushing tip and the interior of the plug shell, particularly when a robotic device is used to remotely position the pushing mechanism with respect to a particular plugged tube. When the open end of the plug shell is threaded, the pushing mechanism may further include a threaded fitting that circumscribes the pushing tip which may be screwed into the threads circumscribing the opened end of the plug shell. In the preferred embodiment, the threads of the threaded fitting are undercut relative to the threads of the plug shell in order to facilitate a threaded engagement between the fitting and the shell. Finally, the pushing mechanism of the expander removal assembly may include a lead screw drive assembly including a motor-driven lead screw for extending the pushing tip into engagement with the expander element of the plug shell. In instances where the expander removal assembly is used to push the expander element completely through the closed end of the plug shell, the use of such a lead screw drive assembly minimizes the amount of kinetic energy imparted to the expander element and the broken-off portion of the plug shell when the pushing tip breaks through the shell.

The plug puller of this system also includes a distal end which may include a pulling tip that is expandably engageable with the interior of the plug shell after the shell has been relaxed and radially contracted by the expander removal assembly, and the welding torch. This pulling tip may likewise be connected to the balance of the plug puller by means of a floating coupling that allows some degree of sideways play in the pulling tip as it is being extended into engagement with the interior of the plug shell.

The system of the invention may also include an improved plug shell that has, in its interior, a section that is separate from the tapered wall section for receiving the expander element when the element is pushed toward the closed end of the shell. Such a structure allows the expander removal assembly to provide sufficient access to the tapered wall section for the torch without having to push the expander element completely through the closed end of the plugged shell.

Finally, the system of the invention may include a frame for mechanically connecting both the torch, the expander remover and the plug puller to a robotically operated device. This frame may have a monitoring mechanism, such as a television camera, for facilitating a proper alignment between the torch, expander remover and plug puller with the open end of the plug to be removed.

In the method of the invention, the expander remover moves the expander element out of engagement with the tapered wall section, thereby providing access to this tapered w all for the torch. In the case of conventional plugs, this tool pushes the expander element completely through the closed end of the plug shell. In the case of improved plugs, this tool merely pushes the expander element out of engagement with the tapered wall section, and into a special, expander-receiving section in the interior of the shell that is located between the tapered wall section and the closed end thereof.

In the next step of the invention, the torch is used to create at least one weld bead within the shell along the tapered wall section. In the preferred method, three such weld beads are provided along the longitudinal axis of the shell, equidistantly spaced approximately 120° apart. When the plug shells are formed from Inconel®, a tungsten-inert gas torch is used at a power level of between about 80 and 100 amps, and a gas flow rate of between about 40 to 50 standard cubic feet per hour. Additionally, the rate of travel of the torch is approximately 0.1 inches per second. The applicants have found that the application of heat from a TIG torch onto the interior walls of a plug advantageously creates a sufficient amount of fusing to cause the plug to relax, but does not result in any welding occurring between the plug shell and the surrounding tube, or any corrosion-sensitizing heat treatment of the surrounding tube. To prevent electrical arcing from the torch body to the plug shell, an insulation shield is provided around the working end of the torch, and the gas flow is directed across the tungsten wire thereof.

The improved system and method provides a reliable means for removing the Inconel® plugs from the heat exchanger tubes of nuclear steam generators that is compatible with commercially available robotic devices, and which obviates the need for exposing human operators to potentially harmful radiation.

DETAILED DESCRIPTION OF THE PREFERRED EMBODIMENT

General Overview of the Components and Operation of the System of the Invention

Figure 1A:
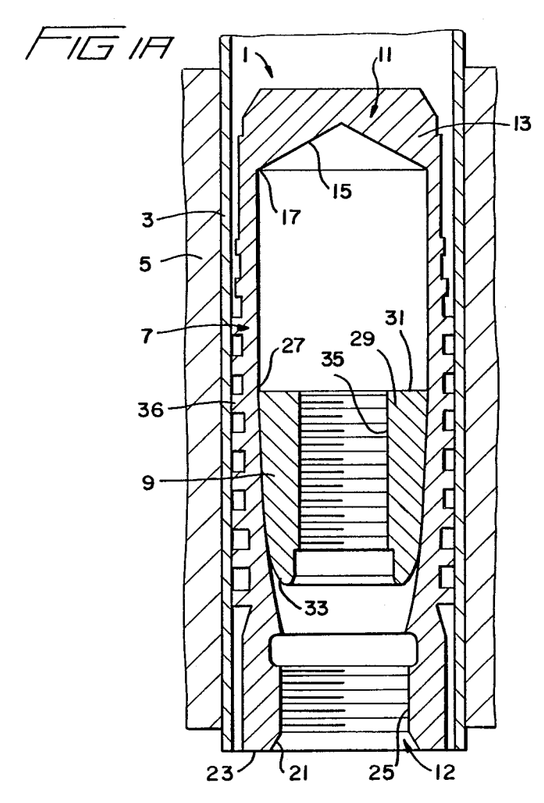
FIG. 1A is a cross-sectional side view of the type of tube plug that the system and method of the invention removes.
Figure 1B:
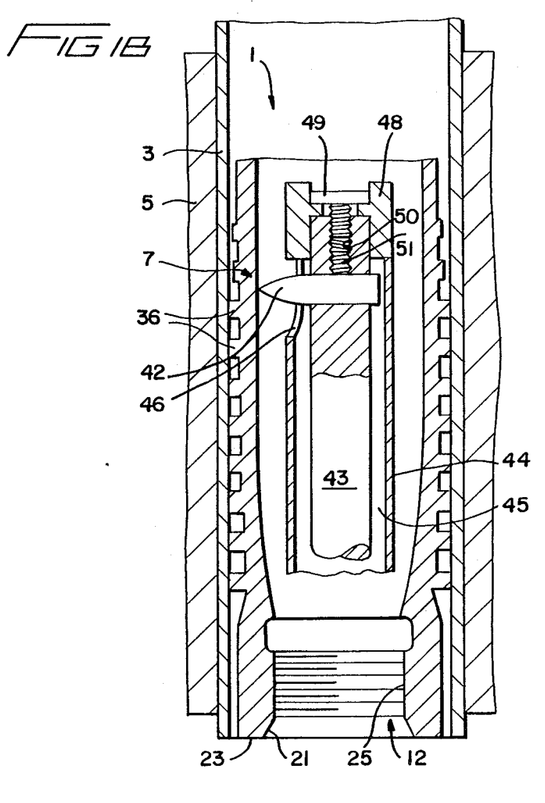
FIG. 1B is a cross-sectional side view of the tube plug of FIG. 1A after the expander removal tool has pushed the expander element through the distal wall of the plug shell.
Figure 1C:
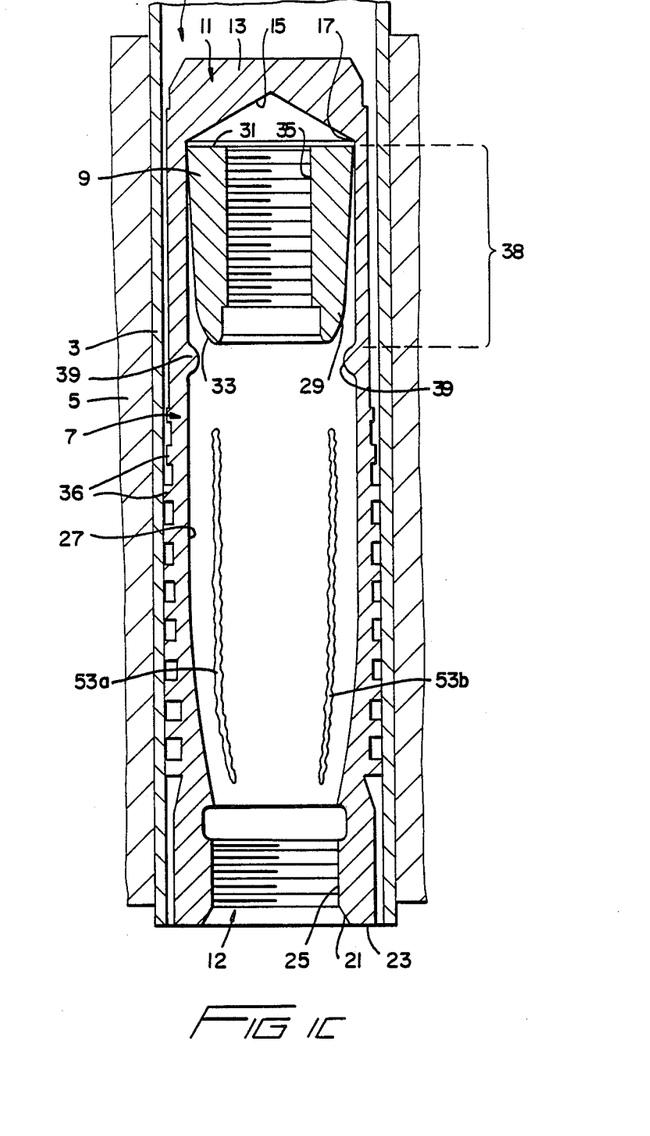
FIG. 1C illustrates an improved plug having an expander-receiving cavity that may be part of the system and method of the invention.

With reference now to FIGS. 1A, 1B and 1C, wherein like numerals designate like elements throughout all the several figures, the plug removal system and method of the invention is particularly adapted for removing Inconel® plugs 1 from the heat exchanger tubes 3 located in the tubesheet 5 of a steam generator, which may be nuclear powered.

Such plugs 1 are generally formed from a tubular shell 7 that contains a tapered expander element 9. The element 9 is slidably movable from the distal closed end 11 of the plug shell to its proximal open end 12. The distal closed end 11 of the shell 7 terminates in a circular wall 13 that includes a chamfer 15 on its inner surface. This wall 13 is integrally formed around the top edge of the shell 7 at shoulder 17. The proximal open end 12 of the shell 7 includes a circular opening 21 circumscribed by a flat annular wall 23. This circular opening 21 leads to a threaded bore 25 as shown. While the shell walls are of generally uniform thickness, the inner walls 27 of the plug shell 7 are tapered inwardly so that when the cork-shaped body 29 of the expander element 9 is drawn from the distal closed end to the proximal open end 12 in the position illustrated in FIG. 1A, the lands 36 of the outer wall of the plug shell 7 are pressed into sealing engagement with the inner wall of the heat exchanger tube 3.

The cork-shaped body 29 of the expander element 9 includes a flat, circular distal end 31 and a rounded proximal end 33. The rounded proximal end 33 helps the expander element 9 to wedgingly expand the shell 7 when it is drawn down against the tapered inner walls 27, while the relatively sharp edge circumscribing the distal end 31 forms a self-locking mechanism that helps to prevent the expander element 9 from moving back toward the distal closed end 11 of the shell 7 after expansion. The cork-shaped body 29 further includes a centrally disposed, threaded bore for engaging a pull rod (not shown) that is used to pull the expander 9 down during the plugging operation. In such plug shells 7, a plurality of circular lands 36 are placed around the outer surface. These lands 36 define localized areas of intense engagement between the outer wall of the shell 7 and the inner wall of the tube 3 when the expander element 9 is pulled down to the position illustrated in FIG. 1A.

As will be described in more detail hereinafter, the system of the invention may also include an improved plug shell 7 that is identical in all respects to the plug shell described with respect to FIG. 1A with the exception of the inclusion of an expander-receiving cavity 38 at its proximal end. The proximal edge of this cavity 38 is defined by a pair of shallow, integrally formed detents 39 that prevent the expander element 9 from being inadvertently pushed up into the cavity 38 prior to the expansion of the improved plug shell 7. When the expander removal tool 55 of the invention is used to push the expander element 9 upwardly within a conventional tube shell 7 in order to mechanically relax the shell 7, the expander element 9 is pushed completely through the wall 13 that forms the distal closed end 11 of the shell 7, as is shown in FIG. 1B. However, when the system of the invention is used in conjunction with the improved shell 7 illustrated in FIG. 1C, the expander element 9 is merely pushed upwardly into the expander receiving cavity 38 as shown.

The system of the invention generally comprises a torch 40 (shown in FIG. 1B), a plug expander removal tool 55 (illustrated in FIGS. 2A through 2C), a frame 140 for coupling the expander removal tool 55 onto the arm of a commercially available robot, such as the ROSA developed by the Westinghouse Electric Corporation, and the plug puller tools 185 and 285 that are illustrated in FIGS. 3A and 3B, and 4A and 4B, respectively.

With reference again to FIG. 1B, the torch 40 is preferably a tungsten-inert gas electric-arc torch that includes a tungsten electrode 42 having a tapered end that is mounted within a bore of a rod-shaped copper conductor 43. The electrode 42 and conductor 43 are concentrically arranged within a cylindrical insulating sleeve 44 as show n. An annul ar space 45 is deliberately left between the exterior of the copper conductor 43 and the interior of the insulating sleeve 44 to form a gas passageway. Additionally, the tapered end of the tungsten electrode 42 extends out through the insulating sleeve 44 from a semi-circular opening 46. The top end of the rod-shaped copper conductor 43 is secured within the insulating sleeve 44 by means of an insulating cap 48 whose bottom edge is connected to the top edge of the sleeve 44, and whose top end includes a mounting screw 49 that is engaged within a threaded bore 50 i the top of the conductor 43. A set screw 51 is also engaged within the threaded bore 50 in order to secure the tungsten electrode 42 within the lateral bore placed within the conductor 43 for this purpose. In the preferred embodiment, the insulating sleeve 44 and the cap 48 are formed from commercially available ceramic materials. The foregoing configuration advantageously allows insert gas to be directed completely around and across the tungsten electrode 42 during the welding operation. Additionally, the insulating sleeve 44 prevents spurious arcing from occurring between the copper conductor 43, and the inner walls 27 of the plug 1.

Figure 2A:
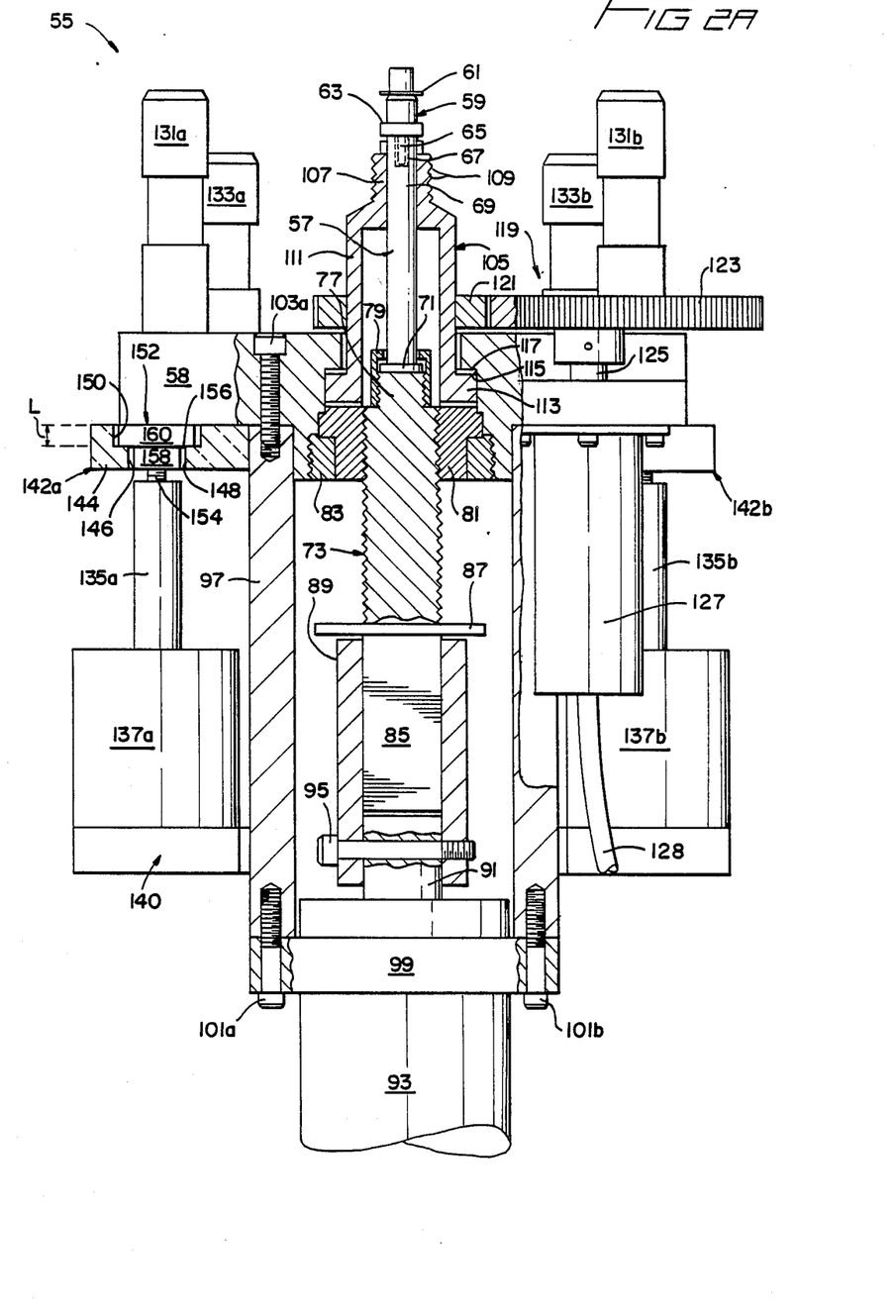
FIG. 2A is a partial cross-sectional front view of the expander removal tool that forms part of the system of the invention.
Figure 2B:
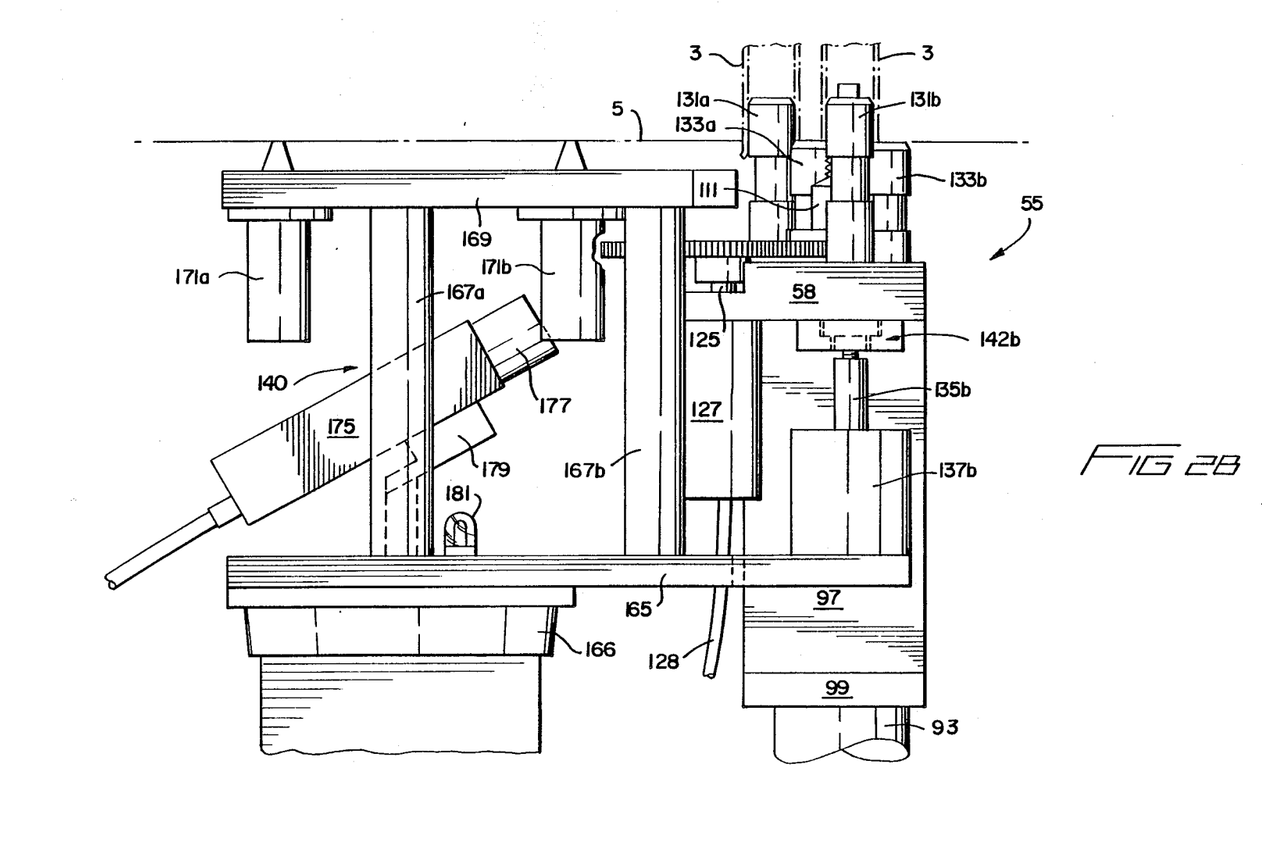
FIG. 2B is a side view of the expander removal tool illustrated in FIG. 2A mounted on the frame that also forms part of the system of the invention.
Figure 2C:
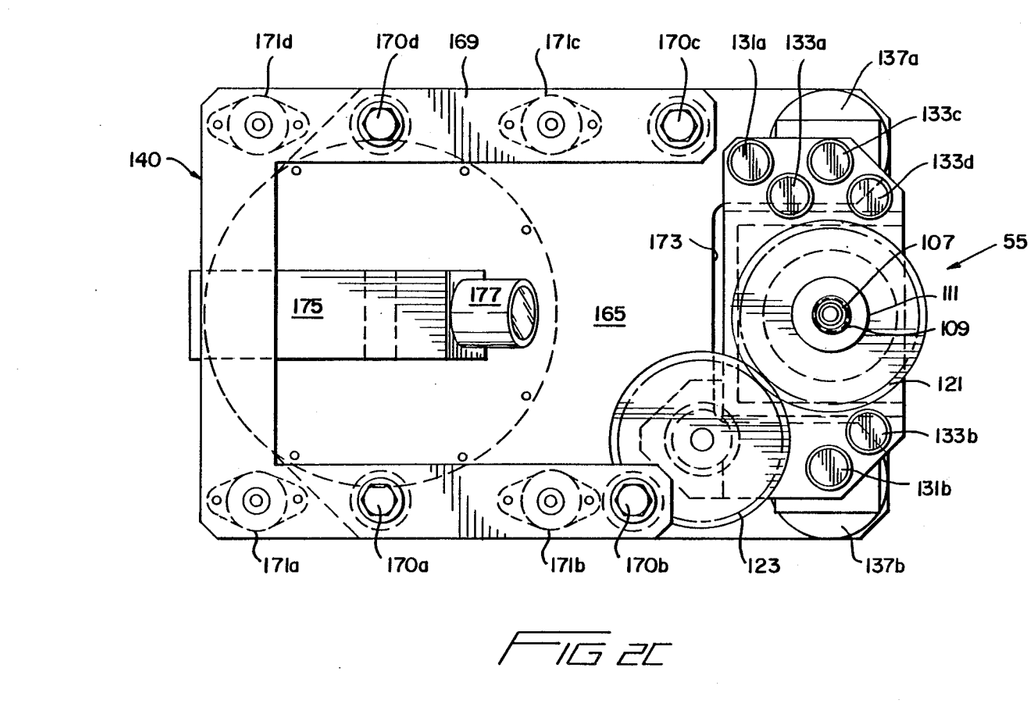
FIG. 2C is a top plan view of the expander removal tool and frame illustrated in FIG. 2B.

With reference now to FIGS. 2A, 2B and 2C, the expander removal tool 55 includes a pushing mechanism 57 for pushing the expander element 9 of a plug 1 either completely through the distal closed end 11 of the plug shell 7 as shown in FIG. 2A, or into the expander receiving cavity 38 in the case of a modified plug 1, as shown in FIG. 1C. To this end, mechanism 57 includes a pushing tip 59 that is insertable within the bore 35 of the cork-shaped body 29 of the expander element 9. The insertion operation is performed by manipulating the entire tool 55 by a robotic arm until the pushing tip 59 is substantially aligned with the circular opening 21 located in the proximal open end 12 of the plug shell 7. The threaded thrust fitting 105 located immediately beneath the pushing tip 59 is rotated by means of a drive mechanism 119 so that the threads 109 become screwed into the threaded bore 25 located at the proximal open end 12 of the plug shell 7. When this operation is completed, the rounded proximal end 33 of the expander element 9 is seated around the annular shoulder 63 of the pushing tip 59. The pushing tip 59 is then advanced toward the distal closed end 11 of the plug shell 7 by means of the lead screw assembly 73. The expander element 9 is either completely pushed out of the plug shell 7 (in the case of a conventional plug 1) as shown in FIG. 1B, or into the expander receiving cavity 38 (in the case of an improved plug 1) as shown in FIG. 1C. In the latter case, it should be noted that the cavity 38 is dimensioned so as to allow ample room for the manipulation of the torch 40 in the interior of the shell 7.

At this juncture, the torch 40 is used to create three weld beads 53a, 53b and 53c (of which only the first two are visible) as shown in FIG. 1C. Preferably, the beads are uniformly spaced 120° from one another with respect to the circumference of the tapered inner walls 27. In the preferred method of the invention, a current of approximately 90 amperes in a gas flow of approximately 45 SCFH is used to create the beads 53a, 53b, 53c, while the rate of travel of the torch 40 is held to approximately 0.1 inches per second. While the length of travel does not have to traverse the entire length of the plug shell 7, it should traverse at least the length of the shell 7 that is engaged against the inner wall of the heat exchange tube 3. Such a length is typically 1.225 inches. As will be explained in more detail hereinafter, the creation of the weld beads 53a, 53b, 53c causes the Inconel ® forming the inner walls 27 to contract when the metal re-solidifies. The overall effect is that the weld beads 53a, 53b, 53c cause the plug shell 7 to radially contract enough to substantially relax the engagement between the lands 36 circumscribing the outer surface of the plug shell 7, and the inner surface of the tube 3.

The plug puller tools 185 and 285 illustrated in FIGS. 3A, 3B and 4A, 4B are used to pull the plug shells 7 from the tubes 3 after the torch 40 has been used to radially contract them by creating the previously described weld beads. In the case of the plug puller tool 185, the threaded pulling tip 189 is inserted and screwed into the threaded bore 25 of the plug shell 7 by means of a drive motor 215. The motor 215 rotates the pulling tip 189 into threaded engagement with the bore 25 by way of rotatable pull rod 197 and flexible coupling 209 until the annular shoulder 195 that circumscribes the bottom of the pulling tip 189 engages the flat annular wall 23 of the plug shell 7. When the pulling tip 189 is so positioned, it should be noted that the thrust sleeve 190 is seated around the outer diameter of the open end of the heat exchanger tube 3. The pulling tip 189 may be slidably withdrawn into the thrust sleeve 190 by means of hydraulic cylinders 241a, 241b. Such a withdrawal of the pulling tip 189 will have the effect of pulling the sleeve 7 out of the tube 3. Because of the radial contraction of the plug sleeve 7 caused by the weld beads, tensile force of only 1,000 pounds or less is all that is typically needed to successfully dislodge the plug shell 7, which is considerably less than the 14,000 pound tensile force usually needed to remove plug shells 7 which have not been radially contracted or otherwise relaxed within their respective tubes 3.

Figure 4A:
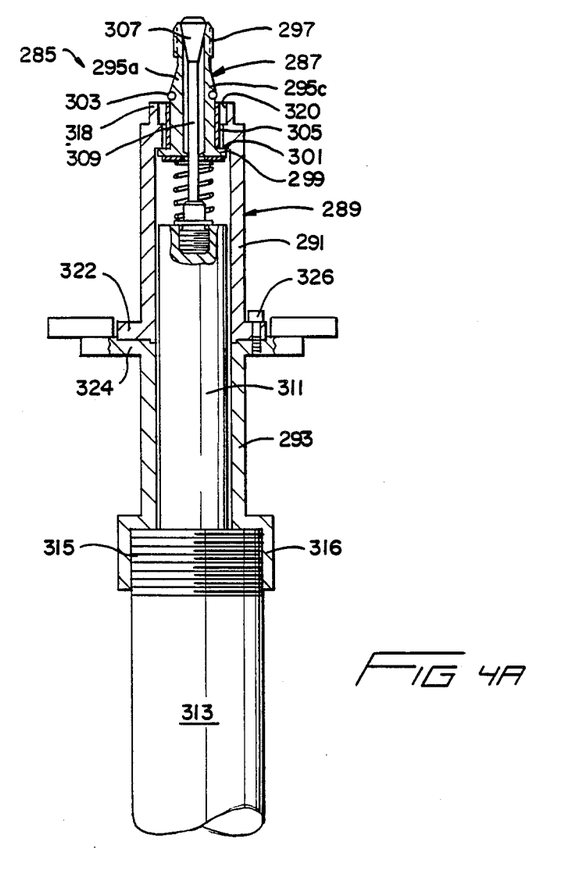
FIG. 4A is a cross-sectional side view of the loose plug puller tool of the system of the invention.
Figure 4B:
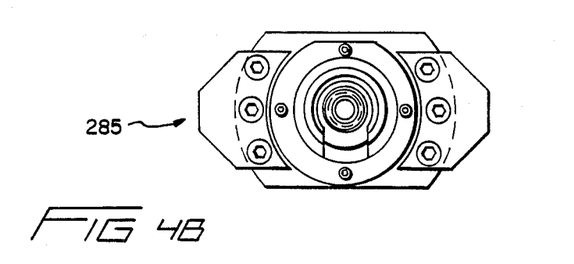
FIG. 4B is a top plan view of the loose plug puller tool illustrated in FIG. 4A.

In the case of plug shells 7 that have been greatly loosened within their respective tubes by means of the weld beads 53a, 53b, 53c, the plug pulling tool 285 illustrated in FIGS. 4A and 4B may be used. This tool 285 has an expandible, internal diameter gripper 287 that extends outwardly from a thrust tube 289. In operation, the internal diameter gripper 287 is inserted through the threaded bore 25 of a plug shell 7 which has been radially contracted. The internal diameter gripper 287 includes three arcuate gripping sections 295a, 295b, and 295c circumscribed with barbed threads 297 that are radially expandable by means of a frustoconical expander element 207 in much the same fashion as the gripping sections of a common drill chuck are expanded or contracted. The entire internal diameter gripper 287 is retractable within the thrust tube 289 by means of the reciprocable output shaft 311 of a hydraulic cylinder 313. When the arcuate gripping sections 295a, 295b and 295c are expanded against the threaded bore 25 of a plug shell 7 and the entire gripper 287 retracted into the thrust tube 289 in the manner previously indicated, the plug shell 7 is pulled out of its respective tube 3.

As will be described in more detail hereinafter, each of the tools 40, 55, 185, and 285 of the system of the invention are connected to the arm of a commercially available robotic device, such as the previously mentioned ROSA by means of a "floating coupling" that allows a small amount of laterally disposed movement with respect to the longitudinal axis of the plug shell 7. Such "lateral slack" allows each of the tools to enter the hollow interior of the plug shell 7 and to perform its function even when the axial alignment between the tool and the plug shell 7 is less than perfect. In addition to being relatively simple and lightweight in construction, each of the tools 40, 55, 185 and 285 is advantageously capable of handling different plug sizes either without any adaptation necessary (as is the case with the torch 40 and the loose plug pulling tool 285), or with the easy replacement of only a few parts (as is the case with the expander removal tool 55 and "tight" plug puller tool 185). In the case of expander removal tool 55, only the pushing tip 59 and threaded thrust fitting 105 need be replaced. In the case of the plug puller tooler 185, only pulling tip 189 and thrust sleeve 190 need be replaced. Additionally, plug puller tool 185 can be used if desired to pull nonrelaxed plugs 1 from tube 3.

Specific Description of the System and Method of the Invention

With reference again to FIGS. 2A, 2B and 2C, the plug expander removal tool 55 of the system of the invention includes a pushing mechanism 57 that is slidably movable with respect to body block 58 in order to push the expander element 9 upwardly with respect to a plug shell 7. The pushing mechanism 57 includes the previously mentioned pushing tip 59. At its top, tip 59 includes a retaining ring 61 which may be a urethane O-ring. The retaining ring 61 engages the centrally disposed threaded bore 35 of the expander element 9 during the operation of the tool 55, and prevents this expander element 9 from forcefully popping off the end of the pushing tip 59 when the expander element 9 is pushed through the distal wall 13 of the shell 7. At its bottom, the pushing tip 59 includes the previously mentioned annular shoulder 63 which engages the rounded proximal end 33 of the expander element 9 when the upper end of the tip 59 is inserted through the expander bore 35. A threaded stud 65 projects downwardly from the annular shoulder 63 as is indicated in phantom.

The threaded stud 65 of the tip 59 is engageable within a threaded bore 67 located at the upper end of a push rod 69. The bottom end of the push rod 69 terminates in an annular flange 71 which is coupled to a lead screw assembly 73 formed in part from a threaded rod 75 having a distal end 77 of reduced diameter. As has been previously indicated, the purpose of the lead screw assembly 73 is to extend and withdraw its push rod 69 from the rest of the tool 55. A locking cup 79 captures the annular flange 71 of the push rod 69 and secures it onto the threaded distal end 77 of the rod 75. The lead screw assembly 73 further includes a drive nut 81 threadedly engaged to the rod 75. The drive nut 81 is mounted within the body block 58 by means of a drive nut retainer 83. The proximal end of the threaded rod 75 terminates in a square shaft 85. A riding disk 87 circumscribes the rod 75 at the transition point between the threads thereon and the square shaft 85. The purpose of this riding disk 87 is to trip a switch (not shown) which automatically deactuates the lead screw assembly 73 when the pushing tip 59 has reached a point of maximum extension. The square shaft 85 that forms the distal end of the rod 75 is slidably received within a square socket 89. The socket 89 is in turn connected to the output shaft 91 of a reversible electric motor 93 by means of retaining screw 95. In the preferred embodiment, reversible motor 93 is a model No. M40RB3-0-07 air motor available from Stanley Air Tools located in Cleveland, Ohio.

The pushing tip 59 is slidably movable within a threaded thrust fitting 105 which circumscribes it as shown in FIG. 2A. The thrust fitting 105 includes a threaded distal end which is circumscribed by a series of screw threads 109 that are undercut with respect to the screw threads of bore 25. The undercut nature of the threads 109 makes it easier to screw the distal end 107 of the fitting 105 into the bore 25. The threaded thrust fitting 105 further includes an enlarged hollow proximal end 111 that terminates in an annular flange 113. The flange 113 is in turn rotatably movable within an annular recess 115, and retained therein by a retaining shoulder 117 on its top side, and the upper surface of the thrust fitting drive mechanism 119 on its lower side.

The function of the thrust fitting drive mechanism 119 is to rotate the thrust fitting 105 relative to the body block 58 in order to screw the threaded distal end 107 thereof into the threaded bore 25 of the plug shell 7. To this end, the drive mechanism 119 includes a driven gear wheel 121 that surrounds and is connected to the enlarged proximal end 111 of the fitting 105. This driven gear 121 meshes with a drive gear 123 that is in turn connected to the output shaft 125 of a reversible motor 127. In the preferred embodiment, motor 127 is a Model No. 311A213-9 reversible electric motor available from Hallmark, Inc, located in Dallas, Tex. An electrical power cord 128 is connected to the bottom casing of the motor 127 as shown. Such a motor is advantageously small and relatively lightweight, which in turn helps keep the size and weight of the overall tool 55 down to a relatively small value that can be easily carried and manipulated by commercially available robotic arms.

The body block 58 forms the principal support member of the overall tool 55. On its upper surface, the body block 58 includes a torque pin 131 which may be removably screwed onto the block 58 at any one of three separate pin insert locations 131a, 131b. and 131c. In operation, the torque pin 131 is inserted into the open end of a heat exchanger tube 3 which is adjacent to the particular heat exchanger tube 3 being unplugged. When the pin 131 is so inserted, it advantageously counteracts the 150 foot-pounds of torque generated by the thrust fitting drive mechanism 119 when the threaded distal end 107 of the thrust fitting 105 is being screwed into the threaded bore 25 of a plug shell 7. Alternative positions 131a, 131b and 131c for the torque pin 131 are provided in case the preferred adjacent tube is plugged or damaged or is otherwise incapable of receiving the torque pin 131. Also projecting from the top surface of the body block 58 are a set of standoffs 133a, 133b, 133c and 133d. In operation, when a robotic arm (not shown) is used to position the threaded distal end 107 of the tool 55 into a proper position with respect to a particular plug shell 7, these standoffs 133a, 133b, 133c and 133d engage the flat bottom surface of the tubesheet 5 after the torque pin 131 has been inserted into an adjacent tube 3, thereby spacing the threaded distal end 107 a known, proper distance from the tube 3 being unplugged.

All of the lateral positioning of the threaded distal end 107 is accomplished by means of the previously referred to robotic arm, as well as most of the axial positioning. The balance of the axial positioning is achieved by the output rods 135a, 135b of a pair of positioning cylinders 137a, 137b located under the bottom surface of the body block 58. As may be most easily appreciated from FIG. 2A, the positioning cylinders 137a, 137 are capable of moving the entire tool vertically a maximum distance of approximately two inches with respect to the frame 140 upon which the cylinders 137a, 137b are mounted.

Floating couplings 142a, 142b connect the body block 58 to the upper ends of the cylinder output rods 135a, 135b. The following description will be specifically confined to the structure of coupling 142a, since the structure of coupling 142b is identical. Coupling 142a is formed in part from a block made from Delrin ® or some other self-lubricating plastic having a bore 146 in the position illustrated. The bore has a bottom portion 148, and a top enlarged portion 150. The coupling 142a further includes a retaining screw 152 having a threaded shank 154 at its bottom that is received within a bore (not shown) in the upper portion of the output rod 135a, and a stepped head 156 whose proximal portion 158 is receivable within the proximal portion 158 of the bore 146, and whose distal enlarged portion 60 is receivable within the distal enlarged portion 150 of the bore 146. The radii of the proximal and distal enlarged portion 148, 150 of the bore 146 is approximately one-sixteenth of an inch greater than the proximal and distal enlarged portion 158, 160 of the stepped head 156. However, the vertical length L of the distal enlarged portion 150 of the bore 146 is only very slightly greater than the length of the distal enlarged portion 160 of the head 156 (i.e., one one-thousandth of an inch or less). The end result of such dimensioning is that the retaining screw 152 is capable of moving laterally one-eighth of an inch in any direction, but is incapable of moving to any significant degree in the vertical (or axial) direction. The lateral slack afforded by the floating couplings 142a, 142b allow the pushing tip 59 to align itself to some degree as it is being pushed into the centrally disposed bore 35 of the expander element 9 lodged near the bottom of a plug shell 7.

With reference now to FIGS. 2B and 2C, the system of the invention further includes the previously mentioned frame 140. This frame 140 serves to connect the plug expander removal tool 55 to the arm of a ROSA or other commercially available robot. The frame 140 includes a rectangularly shaped bottom support plate 165. A ROSA coupler 166 extends downwardly from the bottom surface of the support plate 165, while four connecting rods 167a, 167b, 167c, and 167d extend from the upper surface of the plate 165. The rods 167a, 167b, 167c and 167d connect a U-shaped top plate 169 over the support plate 165. A notch (not shown) is provided in rod 167b to avoid mechanical interference with gear 123. Bolts 170a–170d are used to secure the top plate 169 to these connecting rods. Mounted on the upper side of the top plate 169 are four leveling switches 171a–171d. Basically, these leveling switches 171a–171d inform the operator of the tool 55 when the top plate 169 is uniformly engaged against the bottom surface of the tube sheet 5. In the preferred embodiment, the leveling switches 171a–171d are Model No. 185-1E07 linear pot assemblies available from the Westinghouse Electric Corp. located in Pittsburgh, Pa. As may best be appreciated with respect to FIG. 2B, the plug expander removal tool 55 is carried on the front edge of the frame 140. In order to avoid mechanical interference between the bottom support plate 165 of the frame 140 and the casing 97 of the lead screw assembly 73, a square notch 173 is provided in the front edge of the plate 165 as shown. To further assist the operator in correctly positioning the tool 55, a TV camera 175 is provided in the frame 140 with its lens 177 oriented toward the pushing tip 59. The camera 175 is mounted onto the bottom support plate 165 by means of a bracket 179. Additionally, a light source 181 is provided on the bottom support plate 165 to illuminate the under side of the tube sheet 5 during the positioning operation.

Figure 3A:
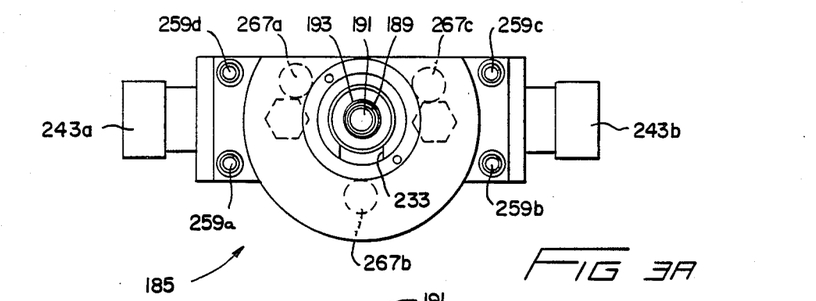
FIG. 3A is a top plan view of the plug puller tool of the system of the invention.
Figure 3B:
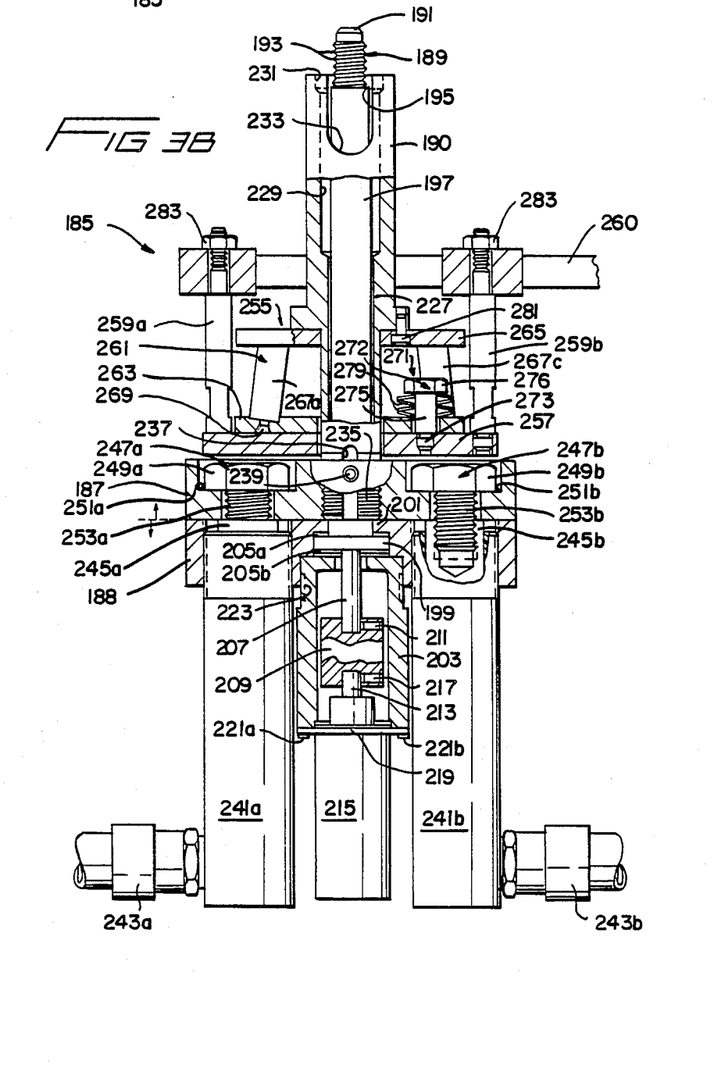
FIG. 3B is a partial cross-sectional side view of the plug puller tool illustrated in FIG. 3A.

With reference now to FIGS. 3A and 3B, the tight plug puller tool 185 includes an upper support plate 187 and a lower support plate 188 that are axially movable with respect to one another. This plug puller tool 185 further includes a pulling tip 189 having undercut threads 193 that are engageable with the threaded bore 25 of a plug shell 7. The pulling tip 189 is surrounded by a thrust sleeve 190 as shown. The upper end of the pulling tip 189 includes an alignment nose 191 that helps to properly align and lead in the undercut threads 193 into the threaded bore 25 of a plug shell 7. The bottom of the tip 189 includes an annular shoulder 195 that engages the flat annular wall 23 that surrounds the circular opening 21 of the proximal open end 12 of the plug shell 7 when the tip 189 is screwed into the bore 25.

The threaded pulling tip 189 is detachably connected to the top end of a rotatable pull rod 197 by a threaded stud and set-screw arrangement (not shown). The bottom end of the pull rod 197 includes a circular flange 199 that is captured between a retaining shoulder 201 on its top side and the upper surface of a shaft casing 203 on its bottom side. Thrust bearings 205a, 205b are provided over the upper and lower surfaces of the circular flange 199 as is indicated. A stub shaft 207 is connected to the bottom surface of the circular flange 199 of the rotatable pull rod 197. This stub shaft is connected to a flexible coupling 209 by means of a set screw 211. The coupling 209 is further connected to the output shaft 213 of a reversible motor 215 by means of another set screw 217. In the preferred embodiment, motor 215 is a Model No. TRW 3118213-9 DC motor available from Hallmark, Inc., located in Dallas, Tex. This motor 215 is connected to the shaft casing 203 by means of a motor mounting plate 219 and screws 221a, 221b. The top end of the shaft casing 203 is in turn connected to the lower support plate 188 by means of screw threads shown generally at 223.

The thrust sleeve 190 of the plug puller tool 185 includes a centrally disposed bore 227 having an enlarged portion 229. An annular recess is provided around the top edge of the sleeve 190 in order to provide clearance for the flat annular wall 23 located on the proximal open end 12 of the plug shell 7. A U-shaped access slot 233 is also provided at the top end of the thrust sleeve 190. This U-shaped slot 233 provides viewing access to the rotatable pull rod 197, which in turn greatly facilitates the removal of a plug shell 7 from the threaded pulling tip 189. The bottom end of the thrust sleeve 190 also includes threads 235. These threads 235 are engageable within a threaded bore that is centrally located within the upper support plate 187. To prevent the thrust sleeve 190 from being inadvertently screwed out of the threaded bore in the upper support plate 187, a keyway 237 is provided across the threads 235. A setscrew 239 located in the side of the support plate 187 is screwed into engagement within the keyway 237 to secure the thrust sleeve 190 within the plate 187. In the preferred embodiment, the keyway 237 does not extend completely through the wall of the thrust sleeve 190 so that the setscrew 239 will not interfere with the rotating and sliding movement of the pull rod 197.

A pair of retraction cylinders 241 provides axial movement between the upper and lower support plates 187 and 188, and in doing so, slidably moves the pull rod 197 within the thrust sleeve 190. Each of the retraction cylinders 241a, 241b includes a hydraulic fluid fitting 243a, 243b for conducting a pressurized hydraulic fluid. Each of these cylinders further includes an output rod 245a, 245b. These output rods are secured onto the upper support plate 187 by means of mounting bolts 247a, 247b. These bolts each include bolt heads 249a, 249b which are receivable within recesses 251a, 251b provided in the upper support plate 187.

Like the previously described expander removal tool 55, the plug puller tool 185 is connected to the arm of a commercially available robot by means of a floating coupling 255. However, as will become evident shortly, the structure of this coupling 255 is substantially different from the structure of the previously described coupling 142a. At its bottom end, the floating coupling 255 includes a connecting plate 257 whose lower surface faces the upper surface of the previously described upper support plate 187. Four connecting rods 259a–259d extend from the top surface of the plate 257.

These connecting rods 259a–259d are ultimately connected to a robotic arm coupling 260. Hence, in operation the entire tool 185 is suspended from the connecting plate 257 via the connecting rods 259a–259d. A coupling plate assembly 261 couples the connecting plate 257 to the thrust barrel 190. This coupling plate assembly 261 is formed from lower and upper coupling plates 263, 265 respectively. Three rubberized springs 267a–267c in turn connect the lower coupling plate 263 to the upper coupling plate 265 by way of mounting screws 269. The lower coupling plate 263 is resiliently connected to the plate 257 by way of a mounting 271 that includes a screw 272 having a threaded end that is engaged within a bore in the plate 257, and a smooth shank 275 and screw head 276. The shank 275 extends through a bore in the lower coupling plate as shown. Belleville washers 279 resiliently bias the lower coupling plate 263 against the plate 257. Mounting screws 281 secure the upper coupling plate 265 to an annular flange for circumscribing the thrust sleeve 190. Nuts 283 in turn connect the previously mentioned robotic arm coupler 260 to the support rods 259a–259d. The net result of all of the interconnected parts that form the floating coupling 255 is that the robotic coupler 260 that supports and suspends the tool 185 is connected to the thrust sleeve 190 of this tool by way of the three, 180° spaced rubberized springs 267a–267c. These springs allow a small degree of lateral movement, but little or no axial movement. Hence, while the structures of the floating couplings 142a and 255 are different, each provides some lateral "slack" movement between the robotic arm and the distal tips of their respective tools which in turn causes these tips to be self aligning when they are vertically moved into engagement with the proximal open end 12 of a plug shell 7.

With reference now to FIGS. 4A and 4B, the loose plug pulling tool 285 of the system includes an expandible, three piece, internal diameter gripper 287 that is surrounded by a thrust tube 289 having a distal section 291, and a proximal section 293.

The internal diameter gripper 287 is formed from three arcuate gripping sections 295a, 295b and 295c. These gripping sections 295a, 295b and 295c are circumscribed by barbed threads 297 at their top ends, and terminate in retaining flanges 299 at their bottom ends. These retaining flanges 299 are captured under an annular shoulder 301 provided at the top of the distal section 291 of the thrust tube 289. The arcuate gripping sections 295a, 295b and 295c are drawn radially toward one another by means of a spring ring 303 that circumscribes each section as indicated in FIG. 4A. Additionally, a retaining sleeve surrounds the bottom portions of the gripping sections 295a, 295b, 295c as shown. A frustoconical expander element 307 connected to an axially movable expander rod 309 radially expands the gripping sections 295a, 295b and 295c when drawn downwardly by the output shaft 311 of a hydraulic cylinder 313. Conversely, the gripping sections 295a, 295b and 295c are radially contracted by the restorative force applied by the spring ring 303 whenever the frustoconical expansion element 307 is pushed upwardly by the output shaft 311.

The top end of the hydraulic cylinder 313 is circumscribed by screw threads 315 which allow the cylinder 313 to be screwed into a threaded enlarged section 316 of the proximal section 293 of the thrust tube 289. As was the case with the tight plug pulling tool 185, an annular recess 320 is formed within the upper edge 318 of the distal section 291 of the thrust tube 289 for receiving the flat annular wall 23 of the proximal open end 12 of a plug shell 7. In the middle of the tool 285, annular mounting flanges 322, 324 of the distal tube section 291 and proximal tube section 293 are interconnected by means of screws 326. Finally, like the previously described expander removal tools 55 and tight plug pulling tool 185, loose plug pulling tool 285 employs floating couplings generally indicated at 328 for mechanically connecting 285 to a robotic arm coupler (not shown). As the structure of these floating couplings 328a, 328b is identical to the previously described couplings 142a, 142b, no further discussion is necessary.

The first steps of the method of the invention may best be understood with respect to FIGS. 1A, 1B, 1C and FIGS. 2A, 2B and 2C. In the first step of this method, the expander element 9 of an expanded plug 1 is pushed upwardly into the plug shell 7 both to provide clearance for the operation of the torch 40, as well as to relax the engagement between the lands 36 that circumscribe the plug shell 7, and the inner wall of the heat exchanger tube 3. To this end, the plug expander removal tool 55 is manipulated underneath a selected heat exchanger tube by means of a ROSA or other commercially available robot. The television camera 175 and light source 181 are actuated, and the system operation uses the resulting TV image to steer the expander removal tool 55 generally into position via frame 140. During the last phases of this step, the system operator aligns the pushing tip 59 with a selected tube 3 while further aligning the pin inserts 131a, 131b with the heat exchanger tubes located on either side of the selected tube 3. He then raises the frame 140 into abutment against the tubesheet 5 until the leveling switches 171a–171d indicate that the top plate 169 of the frame 140 is in level engagement with the bottom surface of the tubesheet 5. The system operator then actuates the positioning cylinders 137a, 137b in order to insert the pushing tip 59 into the centrally disposed, threaded bore 35 of the expander element 9, as well as to insert the torque pin 131 into the open end of a heat exchanger tube 3 flanking the selected tube 3. As has been previously pointed out, the floating couplings 142a, 142b compensate for any small misalignment between the pushing tip 59 and the bore 35 of the expander element 9 by freely allowing small amounts of lateral movement during the insertion operation.

While the pushing tip 59 is being so inserted, the drive mechanism 119 of the threaded thrust fitting 105 is actuated in order to engage the threads 109 thereof into the threaded bore 25 located at the proximal open end 12 of the plug shell 7. After the thrust fitting 105 has been threadedly engaged to the plug shell 7, the motor 93 of the lead screw assembly 73 is actuated in order to extend the pushing tip 59 upwardly. In the case of a state-of-the-art plug 1 (as shown in FIG. 1B), the lead screw assembly 73 runs until the expander element 9 is pushed completely through the distal closed end 11 of the shell 7. In the case of an improved plug 1 (as shown in FIG. 1C), the expander element 9 is pushed back over detents 39 and into the expander receiving cavity 38 located at the distal end of the plug shell 7.

Once the expander element 9 has been dislodged from the tapered inner walls 27 of the plug shell 7 in the manner previously described, the tungsten inert gas torch 40 is inserted through the open end 12 of the plug shell 7 and actuated. The tungsten electrode 42 of the torch 40 is moved axially at a rate of approximately 0.1 inches per second at a power level of preferably 90±5 amperes at a gas flow rate of approximately 45 SCFH in order to create a bead of fused metal along the longitudinal axis of the plug shell 7. This is repeated twice in order to create three weld beads approximately 180° apart from one another. The length of each welding pass should traverse the portion of the plug shell 7 that is in physical engagement with the inner surface of the tube 3. The ceramic sleeve 44 directs the flow of inert gas around and across the tungsten electrode 42 of the torch 40, and prevents spurious arcing from occurring between the copper conductor 43 and the interior of the plug 1.

After the three welding beads have been allowed to cool, either the tight plug pulling tool 185 or the loose plug pulling tool 285 is manipulated by way of robotic arm so that its pulling tip 189 or 287 is in alignment with the proximal open end 12 of the plug shell 7. In the case of the tight plug pulling tool 185, the reversible motor 215 is used to screw the undercut threads 193 of the tip 189 into the threaded bore 25 of the plug shell 7, and the retraction cylinders 241a, 241b are used to pull the shell 7 from the tube 3. In the case of the loose plug pulling tube 285, the expandible internal diameter gripper 287 is inserted into the threaded bore 25, expanded by means of the action of the hydraulic cylinder 313 on the frustoconical expander element 307, and the robotic arm that suspends the entire tool 285 is used to withdraw the plug shell 7 from the tube 3.

We claim:

1. A system for removing a plug from a conduit, wherein said pug is formed from an elongated shell having a closed end, an open end, and inner walls, said shell containing an expander element, and outer walls, and wherein said plug is expanded by axially pulling said expander element within said shell to radially expand said shell so that said outer walls sealingly engage the inner walls of said conduit to plug the same, comprising an expander removal means for pushing said expander element completely through said closed end of said shell while imparting a minimum amount of kinetic energy to said expander element and closed shell end to both relax said plug in said tube and to proved access in said shell, and fusing means for fusing at least one strip of the inner walls along the longitudinal axis of the shell in order to contract the outer walls of said shell.

2. The system of claims 1, wherein said expander removal means includes a pushing tip driven by a lead screw means to minimize the amount of kinetic energy imparted to the expander element when said element is pushed through said closed end of said shell.

3. The system of claim 1, wherein said expander removal means includes a floating coupling to facilitate alignment between said expander removal means and said expander element.

4. The system of claim 1, further including a pulling means for removing the plug shell from the conduit after the fusing means has contracted the outer walls of said shell.

5. The system of claim 4, wherein said pulling means includes a floating coupling to facilitate alignment between said pulling means and the plug shell.

6. A system for removing a plug from a conduit, wherein said plug is of the type that includes an elongated shell having a closed end and an open end, and a shell interior that has a tapered wall section and an expander element that coacts therewith to expand the outer wall of the shell into engagement with the conduit when the expander element is moved from the closed end to the open end of the shell, comprising:
   a. a fusing means for fusing at least one strip of the inner walls of the shell along the longitudinal axis of the shell in order to contract the outer shell walls;
   b. an expander removal means for pushing the expander element from the open end of the shell through the closed end of the shell while imparting a minimum amount of kinetic energy to said expander element and closed shell end to both loosen the shell within the conduit and to provide access within the shell for the fusing means, and
   c. a pulling means for pulling the plug shell from the conduit after the fusing means has contracted the outer shell walls.

7. The system of claim 6, wherein said expander removal means includes a floating coupling to facilitate alignment between said expander removal means and said expander element.

8. The system of claim 7, wherein the expander removal means includes a pushing tip for engaging and pushing the expander element, and wherein said floating coupling connects said pushing tip to the rest of the expander removal means.

9. The system of claim 6, wherein said pulling means includes a floating coupling to facilitate alignment between said pulling means and the plug shell.

10. The system of claim 9, wherein the pulling means includes a pulling tip for engaging and pulling the plug shell from the conduit, and wherein the floating coupling connects the pulling tip to the rest of the pulling means.

11. The system of claim 6, wherein the fusing means includes a welding torch that creates at least one welding bead on the inner walls of the plug shell along the longitudinal axis thereof.

12. The system of claim 6, wherein the expander removal means includes a pushing mechanism having a pushing tip for engaging and pushing the expander element, and a leadscrew drive assembly for driving the pushing tip against the expander element and for minimizing the amount of kinetic energy imparted to the expander element when said element is pushed through the closed end of the plug shell.

13. The system of claim 6, further including a frame for supporting said expander removal means and said pulling means, wherein said frame includes means for remotely monitoring the relative positions of a plug shell to be removed from a conduit, and said expander removal means and said pulling means.

14. A system for removing a metallic plug from a tube, wherein said plug is of the type that includes an elongated shell having a closed end and an open end, and a shell interior that has a tapered inner wall section and an expander element that coacts therewith to expand the outer wall of the shell into sealing engagement with the inner wall of the tube when the expander element is moved from the closed end to the open end of the shell, comprising:
   a. a welding means for creating at least one weld bead along the longitudinal axis of the tapered inner wall of the shell in order to contract the outer shell wall;
   b. a remotely operable expander removal means having a distal end for pushing the expander element from the open end completely through the closed end of the shell in order to relax the engagement between the outer wall of the shell against the inner wall of the tube and to provide access to the tapered inner wall of the shell for the welding means, and
   c. A remotely operable pulling means having a distal end for pulling the plug shell from the tube after the welding means has created said wall-contracting weld bead on the tapered inner wall of the shell.

15. The system of claim 14, wherein both said expander removal means and said pulling means include a floating coupling for allowing the distal ends of each to move orthogonally with respect to the longitudinal axis of the shell when said distal ends are remotely moved into engagement with said plug shell, thereby facilitating alignment between said expander removal means, said pulling means, and said plug shell.

16. The system of claim 14, further including a frame for supporting said expander removal means and said pulling means, wherein said frame includes means for remotely monitoring the relative positions of a plug shell to be removed from a conduit, and said expander removal means and said pulling means.

17. The system of claim 14, wherein the plug shell is screw-threaded around its open end, and the expander removal means includes a pushing mechanism having a pushing tip for engaging and pushing the expander element, and a threaded fitting that surrounds the pushing tip for connecting the pushing mechanism to the threaded open end of the plug shell, and wherein the threaded fitting includes screw threads that are undercut relative to the screw threads of the plug shell in order to facilitate the threaded engagement therebetween.

18. A system for removing a metallic plug from a heat exchanger tube, wherein the plug is of the type that includes an elongated shell having a closed end and an open end, and a shell interior that has a tapered inner wall section and an expander element that coacts therewith to expand the outer wall of the plug shell into sealing engagement with the inner wall of the tube when the expander element is moved from the closed end to the open end of the shell, comprising:

a. a welding means including a tungsten-inert gas torch for creating a plurality of weld beads on the inner tapered wall section of the plug along the longitudinal axis thereof in order to contract the outer shell wall;

b. a remotely operable expander removal means having a pushing tip for pushing the expander element from the open end completely through the closed end of the shell in order to provide access to the tapered inner wall section of the shell for the torch and further to relax the engagement between the outer walls of the shell and the tube, wherein said expander removal means includes a pushing tip that is driven by a leadscrew means to minimize the amount of kinetic energy imparted to the expander element and closed end of said shell when said element is pushed through said closed end of said shell and a floating coupling for allowing the pushing tip to move orthogonally with respect to the longitudinal axis of the shell thereby facilitating alignment between the pushing tip and the plug shell, and c. a remotely operable pulling means having a pulling tip for pulling the plug shell from the tube after the torch applies said plurality of weld beads on said inner tapered wall section of said shell, and a floating coupling for allowing the pulling tip to move orthogonally with respect to the longitudinal axis of the shell thereby facilitating alignment between the pulling tip of the pulling means and the plug shell.

19. The system of claim 18, wherein the pushing tip includes retaining means for retaining the expander element after said element is pushed completely through the closed end of the plug shell.

* * * * *